United States Patent

[11] 3,579,106

[72] Inventor Michael Robert Lord
Basildon, England
[21] Appl. No. 775,600
[22] Filed Nov. 14, 1968
[45] Patented May 18, 1971
[73] Assignee International Standard Electric Corporation
New York, N.Y.
[32] Priority Nov. 30, 1967
[33] Great Britain
[31] 54588/67

[54] LOOP CURRENT DETECTOR
5 Claims, 3 Drawing Figs.

[52] U.S. Cl. .......... 324/140, 179/16, 179/18, 340/253
[51] Int. Cl. .......... G01n 7/00
[50] Field of Search .......... 324/140, 123, 133; 179/(Inquired), 16.4 (A), 16.09 (A), 18.3 (A), 78; 307/235; 340/253; 330/149; 333/12

[56] References Cited
UNITED STATES PATENTS
2,851,638 9/1958 Wittenberg et al. .......... 307/235X
3,047,804 7/1962 Peer et al. .......... 324/140X

*Primary Examiner*—Alfred E. Smith
*Attorneys*—C. Cornell Remsen, Jr., Walter J. Baum, Percy P. Lantzy, J. Warren Whitesel, Delbert P. Warner, James B. Raden and Marvin M. Chaban

ABSTRACT: A detector circuit for detecting current changes in a loop circuit. The currents in both legs of the loop are amplified independently and thereafter combined. The combined current is compared against a reference current to produce an output signal when the combined current exceeds the reference current by a predetermined amount sufficient to bias a threshold network.

Patented May 18, 1971 3,579,106

Inventor
M.R. LORD
By J. B. RADEN
Attorney

LOOP CURRENT DETECTOR

This invention relates to a detector circuit for unipolar signals and in particular to an electronic equivalent of a double-winding electromechanical relay.

In telephone systems dialing impulses produced by the subscriber are transmitted over the loop circuit to the exchange, where the impulses are detected either to control some switching mechanisms or to enable the impulses to be transmitted over a four wire circuit.

A dialing impulse detector must not introduce any appreciable impulse distortion and must be insensitive to any longitudinal voltages which might be induced in the subscriber loop circuit.

It is known to use electromechanical relays for this purpose, but when detection is required in part of an electronic apparatus the use of a conventional relay proves disadvantageous from considerations of size mounting technique and maintenance.

According to the invention there is provided a detector for unidirectional currents flowing in a loop circuit comprising a direct current amplifier connected in each leg of the loop circuit to give an output current proportional to the current flowing in each leg, means to combine the output currents of the two amplifiers, means to compare the combined current with a reference current and means to indicate when the combined current is less or greater than said reference current, the indication being independent of any longitudinal currents flowing in the loop.

The invention will now be described with reference to the accompanying drawings in which.

Figure 1:
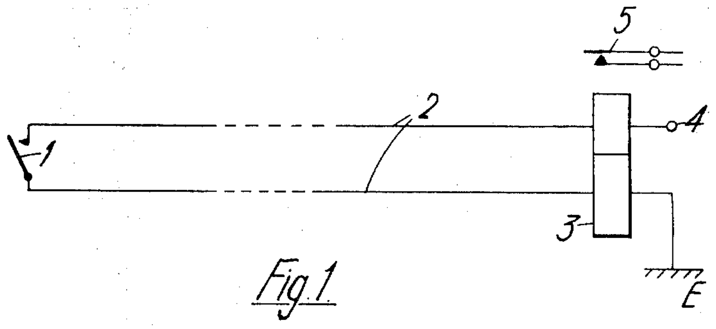
FIG. 1 shows a known type of detector using a relay.

In the circuit of FIG. 1 reference 1 indicates the contacts generating the dialing impulses at the subscriber set. Reference 2 indicates the subscriber loop circuit and 3 indicates the impulse relay at the exchange. The relay winding is provided with two windings, one for each leg of the loop circuit. Both windings are connected in series aiding so that when a voltage V is applied between terminal 4 and earth, and contact 1 is closed, the relay will operate and close contacts 5. Any longitudinal currents induced in the loop will tend to increase the current in one winding of the relay and decrease by an equal amount the current in the other winding. The effect of longitudinal currents on the operation of the relay is thus compensated.

In the above prior-art circuit the currents in both conductors are in effect added algebraically by the magnetic circuit common to both windings of the relay.

Figure 2:
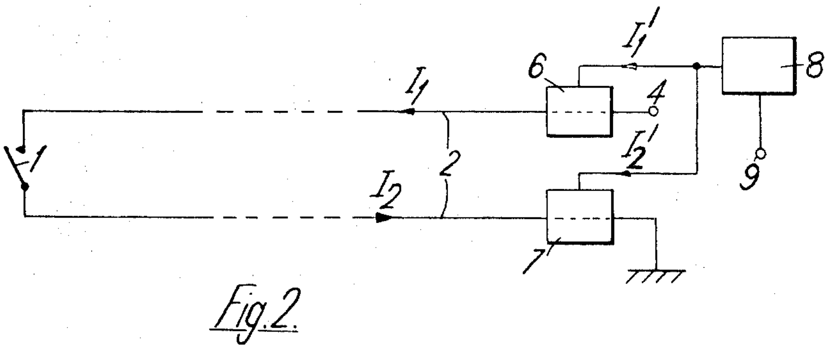
FIG. 2 shows a diagram of the basic circuit of the detector according to the invention.

In the circuit according to an embodiment of the invention shown in FIG. 2, the currents flowing in the conductors of the loop circuit are amplified separately, added to each other and the resultant current is taken to a current threshold detector which operates when its input exceeds a predetermined value.

In FIG. 2 two current amplifiers 6 and 7 are connected into the conductors of the loop circuit 2. Let the input currents to the amplifiers be $I_1$ and $I_2$. These currents will produce amplified output currents $I_1'$ and $I_2'$ which are proportional to the input currents. The amplifier outputs are summed by joining the output leads together and are taken to a threshold detector 8 which delivers a signal at terminal 9 whenever its input exceeds a predetermined value.

When longitudinal currents or voltages are induced in the loop and the latter is balanced, they will tend to increase $I_1$ and decrease $I_2$ by similar amounts. The input to the threshold detector will therefore remain constant.

Figure 3:
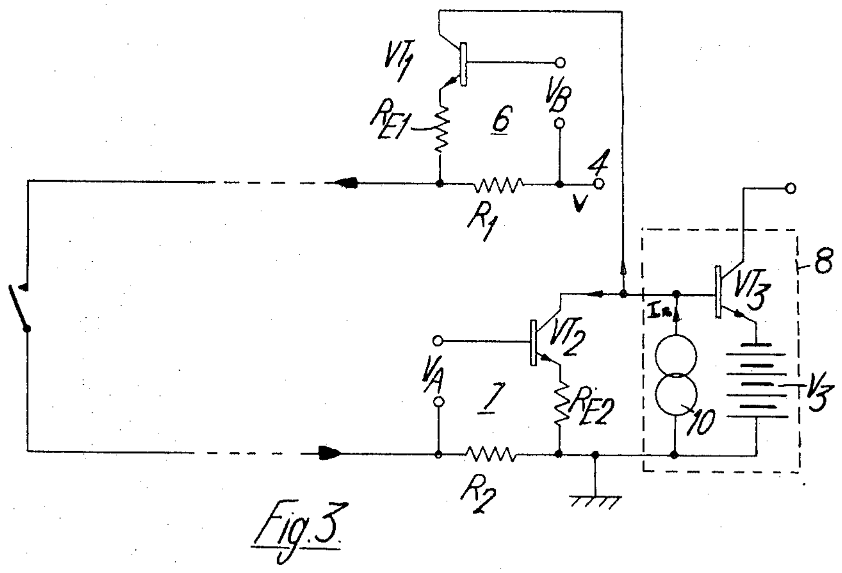
FIG. 3 is a detailed schematic of the circuit of FIG. 2.

A realization of the circuit is shown in FIG. 3.

Line current is applied to the loop circuit via resistors $R_1$ and $R_2$ included in the current amplifiers 6 and 7. Voltage drops $V_1=I_1R_1$ and $V_2=I_2R_2$ are produced in these resistors by the currents flowing in the loop circuit.

Each of the two identical current amplifiers comprises a transistor $VT_1$, $VT_2$ which is forward biassed by the voltage drop across the loop current feed resistor and a fixed voltage bias. The bias applied to the base of transistor $VT_1$ is thus $V_1+V_B$ and to the base of transistor $VT_2$ is $V_2+V_A$. The bias potentials $V_A$ and $V_B$ are chosen so that each transistor operates on the linear part of its characteristic. The respective collector currents will then be $$I_{1'} \simeq \frac{V_1+V_B}{R_{E1}}$$

which is proportional to I, and $$I_{2'} \simeq \frac{V_2+V_A}{R_{E2}}$$

which is proportional to $I_2$.

The collector circuits of the transistors $VT_1$ and $VT_2$ are joined together and are taken to the current threshold detector 8 which comprises a source 10 of constant reference current and a third transistor $VT_3$ whose emitter is connected to a source of fixed potential $V_3$. This latter is chosen so that $$V_3 > (V+V_B)$$

so that collector electrodes of transistors $VT_1$ and $VT_2$ are positive with respect to their emitters when $I_R$ is greater than $I_1'+I_2'$.

When $(I_1'+I_2')$ is less than $I_R$ the difference between these currents will flow into the base electrode of $VT_3$ and turn this transistor on. If however $(I_1'+I_2')$ is equal to or greater than $I_R$ transistor $VT_3$ will be turned off.

As in the relay circuit the presence of any longitudinal loop currents will not affect the operation of the detector.

I claim:

1. A detector for detecting differences in unidirectional current within a closable loop circuit comprising: a direct current amplifier in each leg of the loop circuit tor providing an output current in each leg proportional to the current flowing in each leg, means for combining the output circuits of the two amplifiers, a reference current source, means for comparing the combined current against current from said reference source, and means responsive to a difference between the combined current and the reference current for providing an output signal, wherein the presence of the output signal is independent of any longitudinal currents within the loop.

2. A detector as claimed in claim 1, in which the direct current amplifiers use transistors.

3. A detector as claimed in claim 2, in which a resistor is connected in each leg of the loop circuit, means providing a fixed bias voltage in each leg, wherein the voltage drop in each resistor caused by the loop current and the fixed bias constitute the input signal to each amplifier, the bias voltage being chosen so that the collector current of each transistor amplifier is proportional to the current flowing in the respective leg of the loop circuit.

4. A detector as claimed in claim 3, in which collector electrodes of both said transistors are joined to combine the output currents from said amplifiers and means connecting the junction point to said source of reference current.

5. A detector as claimed in claim 4, in which the indicator comprises a transistor with its base electrode connected to said source of reference current source, a source of constant potential connected to bias the emitter electrode of said indicator electrode when the magnitude of the combined amplifier outputs is less than said reference current the indicator transistor is conducting and is cut off when the magnitude of the combined outputs is greater than the reference current.